(12) United States Patent
Kang et al.

(10) Patent No.: US 8,995,323 B2
(45) Date of Patent: Mar. 31, 2015

(54) METHOD AND APPARATUS FOR REDUCING ACCESS OVERHEAD FROM PAGED DEVICE IN MACHINE TO MACHINE COMMUNICATION SYSTEM

(75) Inventors: Hyun-Jeong Kang, Seoul (KR); Rakesh Taori, Suwon-si (KR); Yeong-Moon Son, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 624 days.

(21) Appl. No.: 13/274,110

(22) Filed: Oct. 14, 2011

(65) Prior Publication Data
US 2012/0093052 A1 Apr. 19, 2012

(30) Foreign Application Priority Data
Oct. 14, 2010 (KR) ........................ 10-2010-0100397

(51) Int. Cl.
G08C 17/00 (2006.01)
H04W 4/00 (2009.01)
H04W 4/08 (2009.01)
H04W 72/00 (2009.01)
H04W 68/02 (2009.01)

(52) U.S. Cl.
CPC ............... *H04W 4/08* (2013.01); *H04W 4/005* (2013.01); *H04W 72/005* (2013.01); *H04W 68/025* (2013.01)
USPC .......................................... 370/311; 370/329

(58) Field of Classification Search
CPC .................................................... H04W 4/005
USPC ....................................................... 370/311
See application file for complete search history.

(56) References Cited

U.S. PATENT DOCUMENTS

| | | | | |
|---|---|---|---|---|
| 6,389,423 | B1 * | 5/2002 | Sakakura | 707/613 |
| 7,636,563 | B2 * | 12/2009 | Kim et al. | 455/343.1 |
| 7,801,078 | B2 * | 9/2010 | Kim et al. | 370/331 |
| 8,270,326 | B2 * | 9/2012 | Kim | 370/311 |
| 8,478,268 | B2 * | 7/2013 | Cho et al. | 455/435.1 |
| 8,792,887 | B2 * | 7/2014 | Baek et al. | 455/435.1 |
| 2005/0122938 | A1 | 6/2005 | Kim et al. | |

(Continued)

FOREIGN PATENT DOCUMENTS

| | | |
|---|---|---|
| JP | 2007-505581 | 3/2007 |
| JP | 2007-515882 | 6/2007 |

(Continued)

OTHER PUBLICATIONS

International Search Report dated Mar. 28, 2012 in connection with International Patent Application No. PCT/KR2011/007665.

(Continued)

*Primary Examiner* — Gerald Smarth

(57) ABSTRACT

An apparatus for an idle mode terminal is configured to perform a method for operating the idle mode terminal in a Machine to Machine (M2M) communication system. A paging message is received from the base station during a paging listening interval. The Apparatus determines whether an indicator indicating receipt of multicast group data is included in the paging message. When the indicator indicating the receiving of multicast group data is included, data transmitted via a downlink resource that uses an identifier mask of a multicast group to which a terminal belongs is received. Thereafter, a paging non-listening interval is entered.

28 Claims, 10 Drawing Sheets

(56) References Cited

U.S. PATENT DOCUMENTS

| | | |
|---|---|---|
| 2005/0208959 A1 | 9/2005 | Chen et al. |
| 2008/0267110 A1* | 10/2008 | Cai et al. .................. 370/315 |
| 2010/0069041 A1* | 3/2010 | Wang et al. ................ 455/411 |
| 2010/0110965 A1 | 5/2010 | Kojima |
| 2010/0159960 A1* | 6/2010 | Chou et al. ................ 455/458 |
| 2010/0178942 A1* | 7/2010 | Laroia et al. .............. 455/458 |
| 2010/0190514 A1* | 7/2010 | Laroia et al. .............. 455/458 |
| 2011/0045763 A1* | 2/2011 | Mohanty et al. ............... 455/7 |
| 2011/0170470 A1 | 7/2011 | Sinnarajah et al. |

FOREIGN PATENT DOCUMENTS

| | | |
|---|---|---|
| JP | 2007-532022 | 11/2007 |
| KR | 1020090127080 A | 12/2009 |
| KR | 1020100091091 A | 8/2010 |
| KR | 1020100094276 A | 8/2010 |
| WO | WO 2009/011047 A1 | 1/2009 |

OTHER PUBLICATIONS

Written Opinion of the International Searching Authority dated Mar. 28, 2012 in connection with International Patent Application No. PCT/KR2011/007665.

Notice of Preliminary Rejection dated Feb. 18, 2014 in connection with Japanese Application No. 2013-533776, 4 pages.

Notice of Patent Grant dated Jun. 17, 2014 in connection with Japanese Application No. 2013-533776, 5 pages.

\* cited by examiner

METHOD AND APPARATUS FOR REDUCING ACCESS OVERHEAD FROM PAGED DEVICE IN MACHINE TO MACHINE COMMUNICATION SYSTEM

CROSS REFERENCE TO RELATED APPLICATION(S) AND CLAIM OF PRIORITY

The present application claims the benefit under 35 U.S.C. §119(a) of a Korean patent application filed in the Korean Intellectual Property Office on Oct. 14, 2010 and assigned Serial No. 10-2010-0100397, the entire disclosure of which is hereby incorporated by reference.

TECHNICAL FIELD OF THE INVENTION

The present invention relates to a system for supporting a Machine to Machine (M2M) communication. More particularly, the present invention relates to an apparatus and a method for reducing an access overhead and delay of an idle mode device in a M2M communication system.

BACKGROUND OF THE INVENTION

A study for a M2M communication service that supports inter-device data communication in the case where a human interaction does not exist or is extremely limited is in progress.

The M2M communication service is in the spotlight in an aspect of reducing costs for managing a device via automated control and communication, and is recognized as a technology that is applicable to fleet management of a vehicle and products mounted on a vehicle, smart metering, home automation, health care, etc.

Unlike a terminal of a general communication system, a M2M communication system that supports M2M communication should consider a case of supporting a device transmitting/receiving limited data during only a limited time.

For example, a device that performs smart metering just transfers a metered numerical value to a smart metering server only one time per month, and a device that performs health care just updates health care information from a health care server only one time per day.

A server of a M2M communication system may transfer the same data to a plurality of devices that have subscribed to the same service, may receive data from the plurality of devices that have subscribed to the same service, and may instruct the devices to remain in an idle mode for a time for which data transmission/reception does not occur.

Therefore, a device that remains in an idle mode performs a system access procedure in order to make a transition to a connected state from the idle mode at a point where data transmission/reception to/from the server is required.

In the case where a plurality of devices belonging, to a specific group perform the system access procedure in order to receive data from a server, or transmit data to the server, it may be difficult for the plurality of devices to succeed in accessing the system at a time.

A device that has failed in accessing the system should perform an access back-off for a predetermined time and retry a system access.

Therefore, a data transmission/reception delay with a device belonging to the group occurs by a time of the access back-off.

SUMMARY OF THE INVENTION

To address the above-discussed deficiencies of the prior art, it is a primary aspect of the present invention to provide a method and an apparatus for reducing an access overhead from a paged device in a M2M communication system.

Another aspect of the present invention is to provide a method and an apparatus for supporting an idle mode for a plurality of devices that have subscribed to a M2M communication service, transmitting the same data to a plurality of devices remaining in the idle mode, and preventing an access collision occurring in a process where the plurality of devices access a system in order to transmit/receive data.

Still another aspect of the present invention is to provide a method and an apparatus for supporting an idle mode for a plurality of devices that have subscribed to a M2M communication service, transmitting the same data to a plurality of devices remaining in the idle mode, and reducing an access delay of the plurality of devices in a process where the plurality of devices access a system in order to transmit/receive data.

In accordance with an aspect of the present invention, a method for operating an idle mode terminal in a Machine to Machine (M2M) communication system is provided. The method includes receiving a paging message from a base station during a paging listening interval, determining whether an indicator indicating receiving of multicast group data is included in the paging message, when the indicator indicating the receiving of multicast group data is included, receiving data transmitted via a downlink resource that uses an identifier mask of a multicast group to which a terminal belongs, and entering a paging non-listening interval.

In accordance with another aspect of the present invention, a method for operating a base station for an idle mode terminal in a Machine to Machine (M2M) communication system is provided. The method includes receiving a paging request message, when an indicator indicating that the terminal receives multicast group data is included in the paging request message, configuring a paging message including the indicator indicating that the terminal receives the multicast group data, transmitting the configured paging message during a paging listening interval, and when the indicator indicating that the terminal receives the multicast group data is included in the paging message, transmitting data to a terminal belonging to a relevant multicast group via a downlink resource that uses an identifier mask of a relevant multicast group.

In accordance with still another aspect of the present invention, an apparatus of an idle mode terminal in a Machine to Machine (M2M) communication system is provided. The apparatus includes a modem that transmits or receives data to or from a base station, and a controller that receives a paging message during a paging listening interval, determines whether an indicator indicating receiving of multicast group data is included in the paging message, when the indicator indicating the receiving of the multicast group data is included, receives data via a downlink resource that uses an identifier mask of a multicast group to which the terminal belongs, and enters a paging non-listening interval.

In accordance with still yet another aspect of the present invention, an apparatus of a base station for an idle mode terminal in a Machine to Machine (M2M) communication system is provided. The apparatus includes a wireless modem that transmits or receives data to or from the terminal, a wired modem that transmits or receives data to or from an upper node, and a controller that receives a paging request message, when an indicator indicating that the terminal receives multicast group data is included in the paging request message, configures a paging messaging including the indicator indicating that the terminal receives the multicast group data, transmits the configured paging message during a paging listening interval, and when the indicator indicating that the terminal receives the multicast group data is included in the paging message, transmits data to the terminal belonging to a relevant multicast group via a downlink resource that uses an identifier mask of the relevant multicast group.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide a method and an apparatus for reducing an access overhead from a paged device in an M2M communication system.

More particularly, exemplary embodiments of the present invention provide an alternative for transmitting data to a plurality of devices remaining in an idle mode, and reducing an access overhead occurring when the plurality of devices transmit data among alternatives for supporting an idle mode of a device in an M2M communication system.

Exemplary embodiments of the present invention include a process for receiving data at a device belonging to the same group without a system access procedure from an idle mode in an M2M communication system, and include a process for transmitting data without the system access procedure at a device existing in the idle mode.

Figure 1:
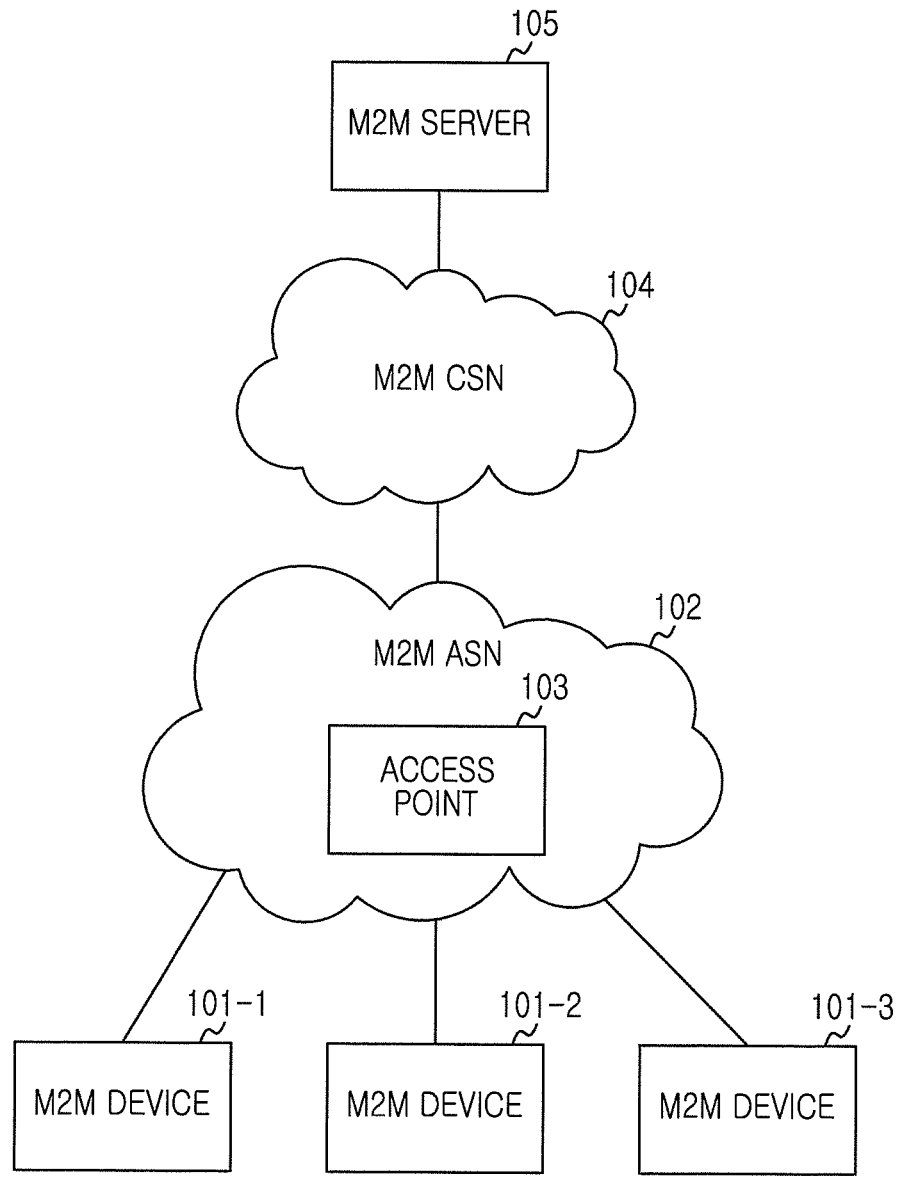
FIG. 1 illustrates a communication system that supports M2M communication according to an exemplary embodiment of the present invention.

FIG. 1 is illustrates a communication system that supports M2M communication according to an exemplary embodiment of the present invention.

Referring to FIG. 1, an M2M communication system includes M2M devices 101-1, 101-2, 101-3 that support the M2M communication, an M2M Access Service Network (ASN) 102 that supports the M2M communication, an access point 103 included in the M2M ASN, an M2M Connection Service Network (CSN) 104 that supports the M2M communication, and an M2M server 105 that supports the M2M communication.

The devices 101-1, 101-2, 101-3 correspond to terminals in which an application program required for the M2M communication is mounted.

The M2M ASN 102 provides a wireless access point required for communication between the devices 101-1, 101-2, 101-3 and the M2M server 105. The access point 103 corresponds to a base station for controlling radio resources required for communication between the devices 101-1, 101-2, 101-3 and the M2M server 105.

The M2M CSN 104 provides a user side connection service to the devices 101-1, 101-2, 101-3.

The M2M server 105 is a device performing communication with one device or a plurality of devices 101-1, 101-2, 101-3. The M2M server 105 mounts an application program required for the M2M communication and has an interface via which a user may access. The M2M server 105 can be included in the M2M CSN 104 depending on system operation.

In the M2M communication system, an Institute of Electrical and Electronics Engineers (IEEE) 802.16 communication system standard can be applied as a radio interface between the devices 101-1, 101-2, 101-3 and the access point 103. The devices 101-1, 101-2, 101-3 can perform an operation of a mobile station defined in an IEEE 802.16 communication system. In the following description, the device is clearly described as a terminal.

Figure 2:
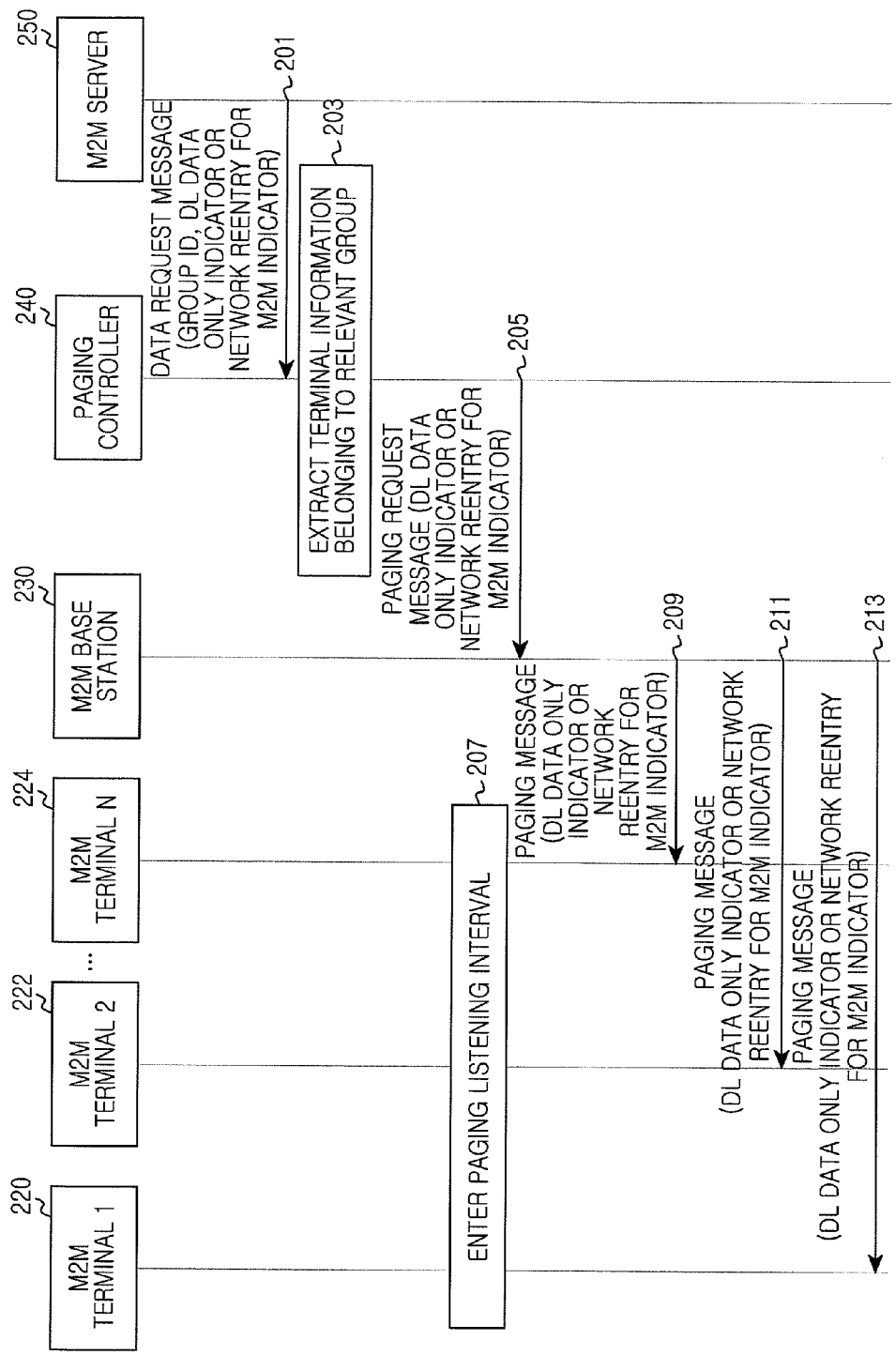
FIG. 2 illustrates an operation of processing paging of an idle mode terminal in an M2M communication server, a paging controller, and a base station of an M2M communication system according to an exemplary embodiment of the present invention.

FIG. 2 illustrates an operation of processing paging of an idle mode terminal in an M2M communication server, a paging controller, and a base station of an M2M communication system according to an exemplary embodiment of the present invention.

Referring to FIG. 2, when data to be transmitted to M2M Service Station (SS) 1, 2, N 220, 222, 224 remaining in an idle mode occur, an M2M communication server 250 transfers the data to a system controller that manages the terminals 220, 222, 224 of the idle mode (block 201). Here, the system controller is referenced as a paging controller 240.

Though it is assumed that the M2M communication server 250 and the paging controller 240 directly give or take messages there-between in FIG. 2, a scenario that a different system entity can exist between the M2M communication server 250 and the paging controller 240 to relay communication between the two entities may be considered.

Data transmitted in block 201 correspond to group data required for group communication of a device. In addition, the group data include identifier information of a group that is to receive the data, a DL data only indicator for whether only the group data is received, a network reentry indicator for whether the group data is received and whether uplink data is transmitted, and an indicator for uplink data transmission.

The paging controller 240 that has received the data transmitted in block 201 collects information of a, terminal belonging to a group that is to receive the data among idle mode terminals managed by the paging controller 240 (block 203).

The paging controller 240 transmits a paging request message requesting the collected idle mode terminal to transmit a paging message to a base station 230 managed by the paging controller 240 (block 205).

The paging request message includes identifier information of a group that is to receive data and an idle mode terminal, a DL data only indicator for whether the idle mode terminal receives only group data, a network reentry indicator for whether the idle mode terminal should receive group data and transmit uplink data, and an indicator for uplink data transmission.

When receiving the paging request message, the base station 230 configures a paging message including a DL data only indicator for whether only the group data is received, a network reentry indicator for whether the group data and the uplink data should be transmitted, an indicator for uplink data transmission, a group identifier, and an identifier of a terminal that should receive or transmit the data, and transmits the configured paging message (blocks 209, 211, 213).

The paging message transmitted in blocks 209 to 213 is transmitted in a broadcast method, so that all idle mode terminals monitoring the base station 230 can receive the paging message.

The paging message transmitted in blocks 209 to 213 has a structure of Table 1 below.

TABLE 1

| Paging Message (MOB_PAG-ADV) { | |
|---|---|
| Paging Group Identifier List | Information below is included to each Paging Group Terminal or Group Identifier |
| Action code | 0: DL data only indicator |
| | 1: Network reentry indicator |
| } | |

The paging message of Table 1 includes identifier information of a paging group to which the base station belongs, a terminal that receives group data or should receive group data and transmit uplink data among idle mode terminals belonging to the paging group, an identifier of a group, an DL data only indicator for whether the terminal should receive only group data, or a network reentry indicator for whether the terminal should receive group data and transmit uplink data.

In the case where the base station 230 belongs to one or more paging groups, the terminal and an action code of the terminal can be included for each paging group.

Alternatively, the paging message can have a structure of Table 2.

TABLE 2

| Paging Message (MOB_PAG-ADV) { | |
|---|---|
| Paging Group Identifier List | Information below is included to each Paging Group. |
| DL data only indicator | 0: DL only data does not exist |
| | 1: DL only data exists |
| If (DL data only indicator==1){ | |
| Group ID list | Group Identifier information to receive DL data |
| } | |
| Network reentry indicator | 0: Not required to transmit UL Data |
| | 1: Required to transmit UL Data |
| If (Network reentry indicator==1) { | |
| MS ID list | Terminal Identifier Information to transmit UL data |
| } | |
| } | |

The paging message of Table 2 includes identifier information of a paging group to which the base station 230 belongs. In addition, in the case where the base station 230 belongs to one or more paging groups, the paging message includes a DL data only indicator for whether the terminal should receive only group data for the each paging group, a group identifier to which a terminal that should receive the group data belongs in the case where an indicator for whether the terminal should receive only group data has been set, a network reentry indicator for whether the terminal should receive group data and transmit uplink data, and an identifier of a terminal that should receive group data and transmit uplink data in the case where an indicator for whether the terminal should receive the group data and transmit uplink data has been set.

Meanwhile, terminals 220, 222, 224 remaining in the idle mode make a transition to a paging listening interval set in advance, and receive the paging message of Table 1 or Table 2 from the base station 230 during the paging listening interval (block 207).

The above-described group identifier can be referenced as a multicast group identifier, and the above-described group can be referenced as a multicast group, and the paging group can be referenced as a multicast group. In addition, the paging messages of Table 1 and Table 2 can additionally include a time for which data (multicast group data) directed to a terminal is transmitted, that is a multicast transmission start time. The transmission start time can be expressed by a specific bit of a frame number. The transmission start time is faster than a start time of the next paging listening interval. In addition, a base station can inform that the multicast data transmission ends by transmitting a message indicating the multicast data transmission ends to a terminal.

Additionally, a case where the terminal does not receive group data but transmits uplink data can be considered. In this case, the base station can incorporate a report code indicating that uplink data should be transmitted into Table 1 and Table 2, and transmit the same.

In this case, the base station can allocate an uplink resource to a terminal that transmits uplink data. If another terminal that uses the same terminal identifier on the same uplink frame of a transmitted uplink burst exists, the base station can allocate a resource to the relevant terminal using an ACID of the uplink burst and a different ACID.

Figure 3:
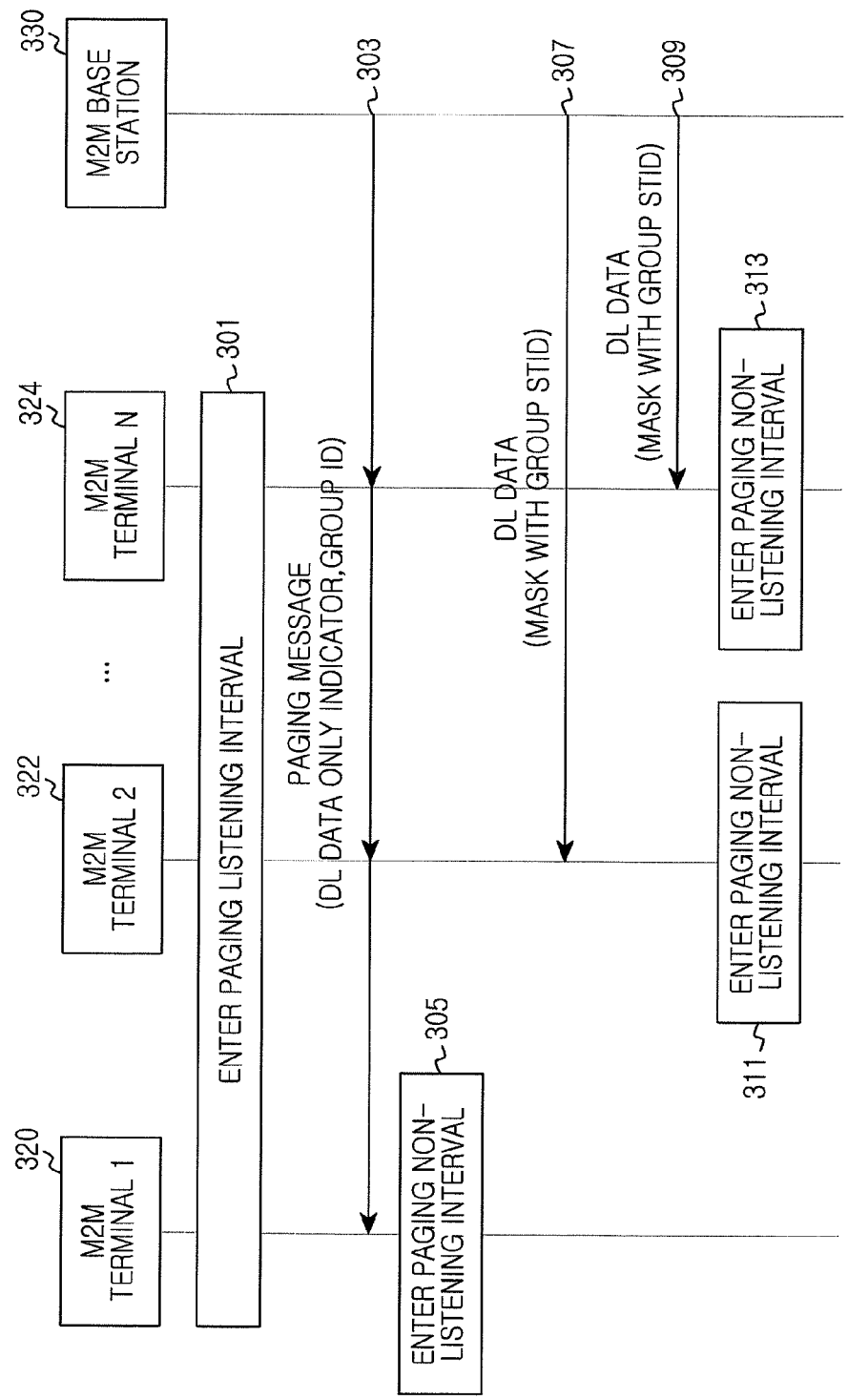
FIG. 3 illustrates an operation of processing a paging message and downlink data at an idle mode terminal and a base station of an M2M communication system according to an exemplary embodiment of the present invention.

FIG. 3 illustrates an operation of processing a paging message and downlink data at an idle mode terminal and a base station of an M2M communication system according to an exemplary embodiment of the present invention.

Referring to FIG. 3, terminals 320, 322, 324 enter a paging listening interval to receive a paging message transmitted by a base station 330 (block 301).

The paging message has a structure of Table 1 or Table 2. An example of FIG. 3 illustrates a case of receiving a paging message including a DL data only indicator for whether the terminals 322 and 324 should receive only group data and information of the group identifier.

If an identifier of the terminal 320 and a group identifier to which the terminal belongs are not included in the paging message received in block 303, the terminal 320 recognizes that data to be received do not exist and makes a transition to a paging non-listening interval (block 305).

If a group identifier to which the terminals 322 and 324 belong is included in the paging message received in block 303, the terminals 322 and 324 receive the group data in block 307 and block 309, respectively.

Here, a downlink resource for group data which the terminal 322 or the terminal 324 is to receive is encoded using a group identifier mask to which the terminals 322 and 324 belong. The group identifier mask encoding the group data is defined in advance. The group identifier mask encoding the downlink resource is configured as follows.

An encoding identifier for a resource of group data is marked as masking prefix 1-bit, an indicator 3-bit informing a resource of group data, a group identifier n-bit for a resource of group data, and an identifier (12-n)-bit representing group data. The identifier (12-n)-bit representing the group data is set by 0 corresponding to (12-n)-bit. The value n is determined depending on the number of groups existing in a system.

The group identifier n-bit is provided to the terminal as one of information regarding the group when the terminal subscribes to a group service of an M2M communication service.

If the mask prefix is 0b0, the indicator informing a resource of group data is 0b010, and a group identifier for a resource of group data is 0b110, then the group identifier mask can be represented by 0010110000000000. Here, the identifier representing group data becomes 0b000000000.

The terminals 322 and 324 make a transition to a paging non-listening interval (blocks 311 and 313).

Figure 4:
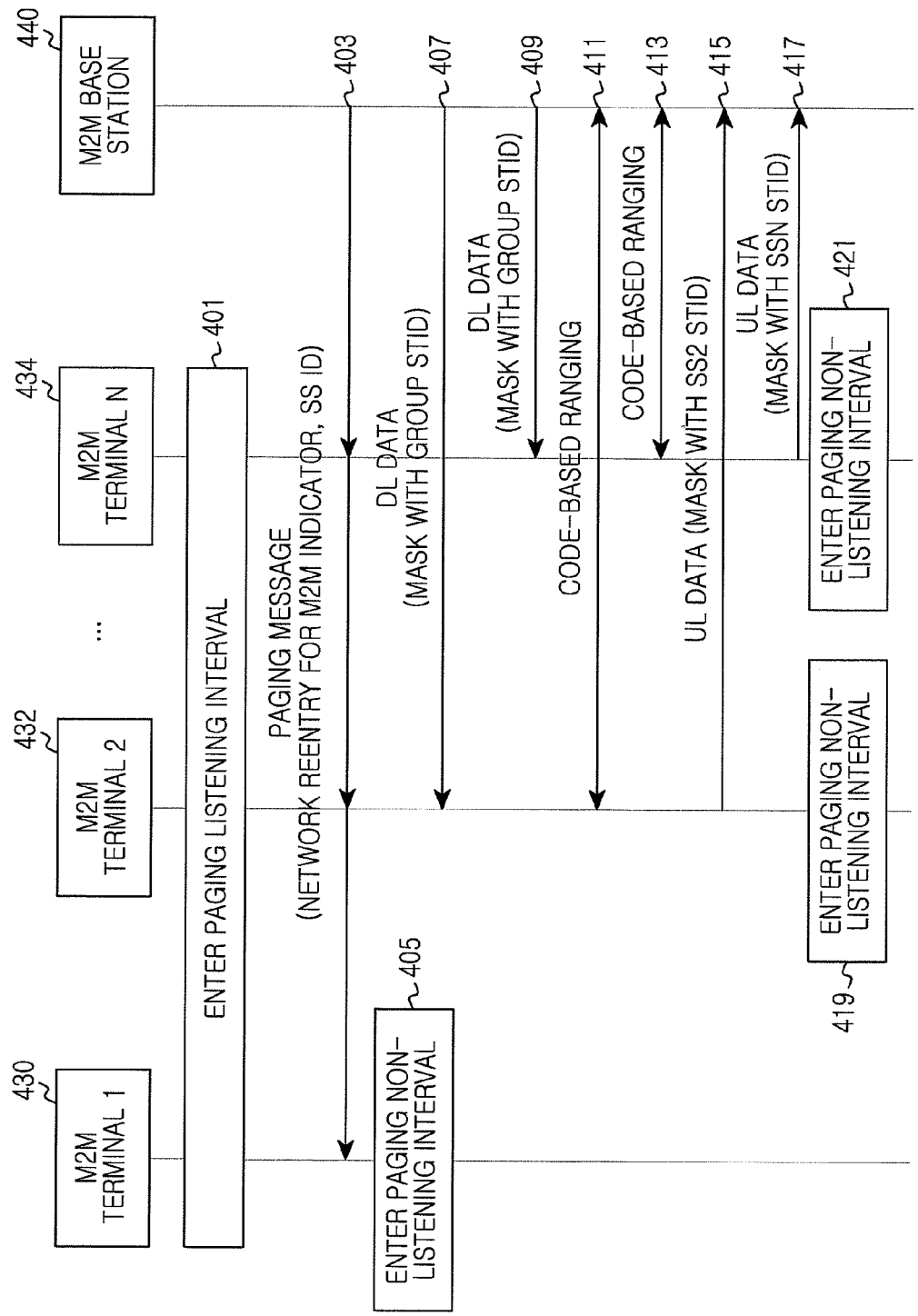
FIG. 4 illustrates an operation of processing a paging message and downlink/uplink data at an idle mode terminal and a base station of an M2M communication system according to an exemplary embodiment of the present invention.

FIG. 4 illustrates an operation of processing a paging message and downlink/uplink data at an idle mode terminal and a base station of an M2M communication system according to an exemplary embodiment of the present invention.

Referring to FIG. 4, terminals 430, 432, 434 make a transition to a paging listening interval to receive a paging message transmitted by a base station 440 (block 401).

The paging message has a structure of Table 1 or Table 2. In an example of FIG. 4, the paging message transmitted by the base station 440 includes a network reentry indicator for whether the terminals 430, 432, 434 should receive group data and transmit uplink data, and an identifier SSID of a terminal that should receive the group data and transmit uplink data.

When the terminal 430 decodes the paging message, in the case where an identifier of the terminal 430 and a group identifier to which the terminal 430 belongs are not included in the paging message, the terminal 430 makes a transition to a paging non-listening interval (block 405).

In addition, the terminals 432 and 434 decode the paging message. When the paging message includes an indicator indicating that the terminals 432 and 434 should receive the group data and transmit uplink data, the terminals 432 and 434 receive data of a group to which the terminals 432 and 434 belong in blocks 407 and 409.

When the terminals 432 and 434 receive data of the group in blocks 407 and 409, respectively, a downlink resource for the group data is encoded using the group identifier mask by the encoding rule described in FIG. 3.

The terminals 432 and 434 perform a code-based ranging procedure with the base station in order to transmit uplink data (blocks 411 and 413).

The terminals 432 and 434 that have successfully performed the code-based ranging procedure in blocks 411 to 413 transmit uplink data via the uplink resource allocated by the base station 440 (blocks 415 and 417).

Here, the uplink resource via which the terminals 432 and 434 transmit the uplink data in blocks 415 and 417 is encoded by the following encoding rule to discriminate between the terminals 432 and 434.

Encoding information for the uplink resource includes a masking prefix 1-bit for a resource of group data, an indicator 3-bit informing a resource of group data, a group identifier n-bit for a resource of group data, and an identifier (12-n)-bit of a terminal inside the group.

For example, assuming that the mask prefix is 0b0, the indicator informing a resource of the group data is 0b010, the group identifier is 0b110, and the identifier of the terminal inside the group is 000010000, a mask for the uplink resource is expressed by 0010011000010000.

Here, the value n is determined depending on the number of groups existing in the system. In addition, a service flow identifier (FID) included in a header of uplink data transmitted by the terminal corresponds to a flow identifier defined in advance in order to identify a group service to which the terminal has subscribed.

The terminals 432 and 434 make a transition to a paging non-listening interval (blocks 419 and 421).

Figure 5:
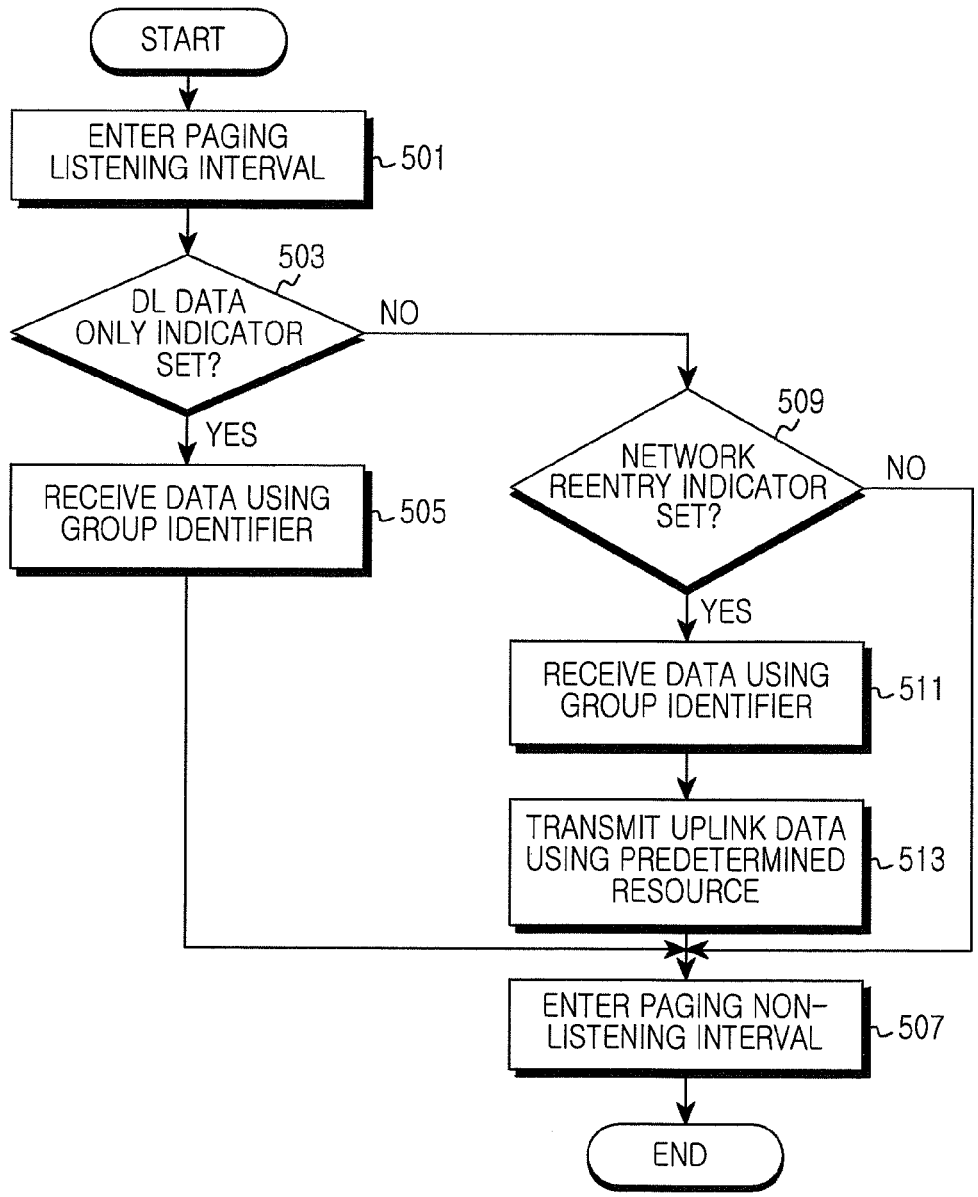
FIG. 5 illustrates an operation of an idle mode terminal in an M2M communication system according to an exemplary embodiment of the present invention.

FIG. 5 illustrates an operation of an idle mode terminal in an M2M communication system according to an exemplary embodiment of the present invention.

Referring to FIG. 5, the terminal enters a paging listening interval (block 501). The terminal receives a paging message during the paging listening interval, and determines whether a DL data only indicator for whether only group data should be received has been set to the terminal (block 503).

When the DL data only indicator for whether only group data should be received is included, the terminal receives data transmitted via a downlink resource encoded using an identifier mask of a group to which the terminal belongs (block 505).

The terminal enters a paging non-listening interval of an idle mode (block 507).

When the DL data only indicator for whether only group data should be received is not included (block 503) and a network reentry indicator for whether the terminal should receive group data and transmit uplink data is included in the received paging message (block 509), the terminal receives data transmitted via a downlink resource encoded using an identifier mask of a group to which the terminal belongs (block 511).

In addition, the terminal decodes an uplink resource allocated to the terminal using an identifier determined to be used by the terminal and transmits data via the uplink resource during the idle mode (block 513).

The terminal makes a transition to a paging non-listening interval of the idle mode (block 507).

When information regarding the terminal is not included in the paging message (block 509), the terminal makes a transition to the paging non-listening interval of the idle mode (block 507).

Thereafter, the terminal ends the algorithm according to an exemplary embodiment of the present invention.

Figure 6:
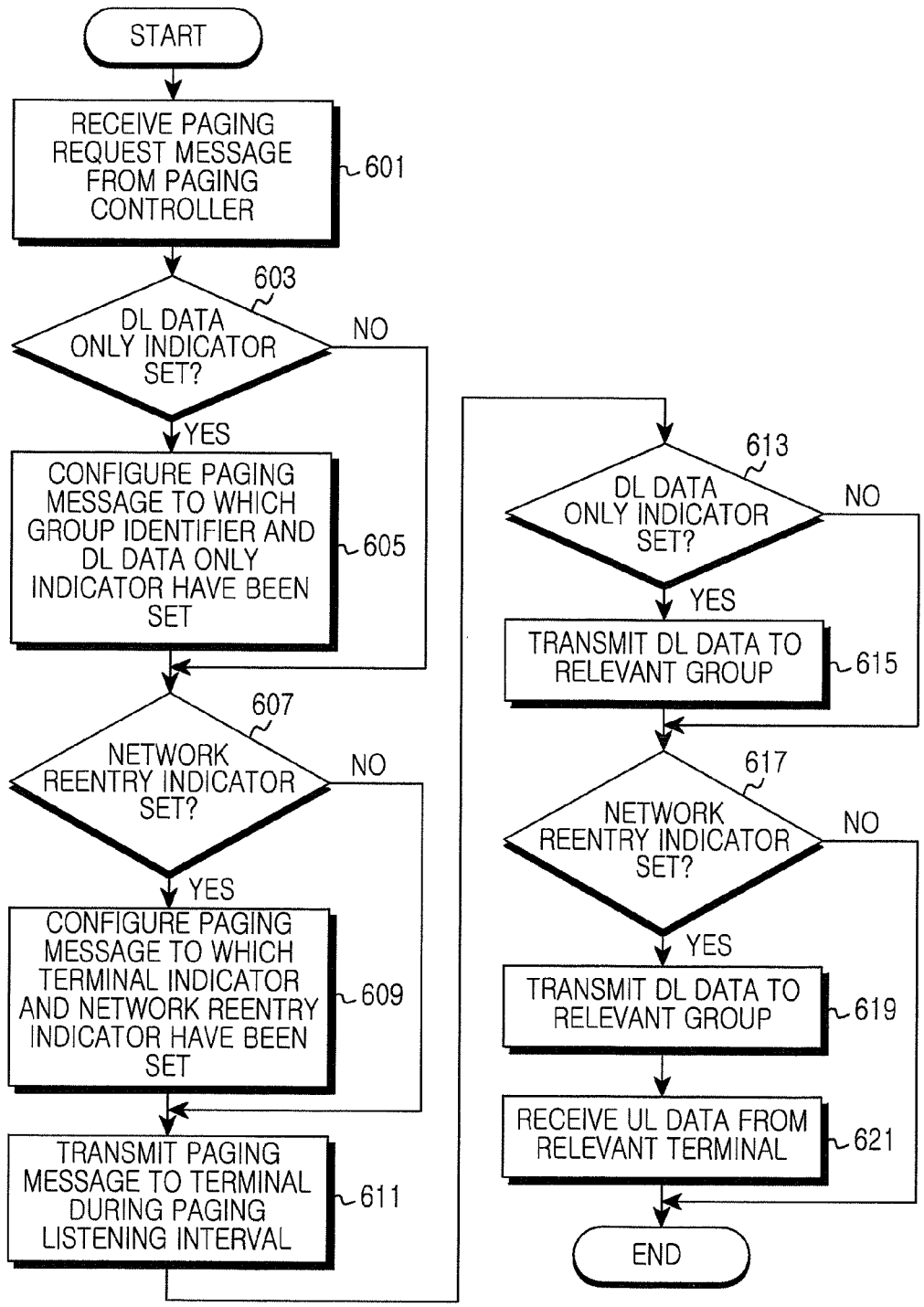
FIG. 6 illustrates an operation of a base station processing data of an idle mode terminal in an M2M communication system according to an exemplary embodiment of the present invention.

FIG. 6 illustrates an operation of a base station processing data of an idle mode terminal in an M2M communication system according to an exemplary embodiment of the present invention.

Referring to FIG. 6, the base station receives a paging request message from a paging controller (block 601).

The paging request message includes information of a terminal identifier, a group identifier, a DL data only indicator for whether the terminal should receive only group data, a network reentry indicator for whether the terminal should receive group data and transmit uplink data, and a paging group identifier.

When the DL data only indicator for whether the terminal should receive only group data is included in the paging request message (block 603), the base station configures a paging message including the identifier of the group and the DL data only indicator for whether the terminal should receive only group data (block 605).

When the network reentry indicator for whether the terminal should receive group data and transmit uplink data is included in the paging request message (block 607), the base station configures a paging message including the network reentry indicator for whether the terminal should receive group data and transmit uplink data (block 609).

The base station transmits the paging message at a point corresponding to a paging listening interval (block 611).

When the DL data only indicator for whether the terminal should receive only group data is included in the paging message (block 613), the base station transmits data to a terminal belonging to a group via a downlink resource encoded using an identifier mask of a relevant group (block 615).

When the network reentry indicator for whether the terminal should receive group data and transmit uplink data is included in the paging message (block 617), the base station transmits data to a terminal belonging to a group via a downlink resource encoded using an identifier mask of the relevant group (block 619).

In addition, the base station allocates a resource required for transmitting uplink data at a relevant terminal, and the resource is encoded using an identifier mask determined to be used by the terminal during the idle mode.

The base station receives data from the terminal via the uplink resource (block 621). A point at which the base station allocates the uplink resource to the terminal corresponds to the same frame as a point of transmitting downlink data in block 619 or the next frame.

Thereafter, the base station ends the algorithm according to an exemplary embodiment of the present invention.

Figure 7:
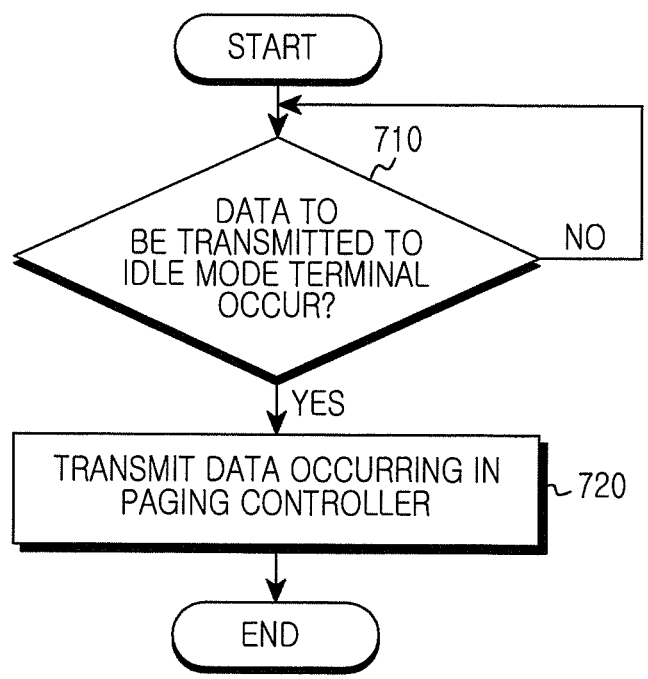
FIG. 7 illustrates a process of operating an M2M communication server in an M2M communication system according to an exemplary embodiment of the present invention.

FIG. 7 illustrates a process of operating an M2M communication server in an M2M communication system according to an exemplary embodiment of the present invention.

Referring to FIG. 7, when data to be transmitted to an idle mode terminal occurs (block 710), the M2M communication server transmits the occurring data to a paging controller (block 720).

Thereafter, the M2M communication server ends the algorithm according to an exemplary embodiment of the present invention.

Figure 8:
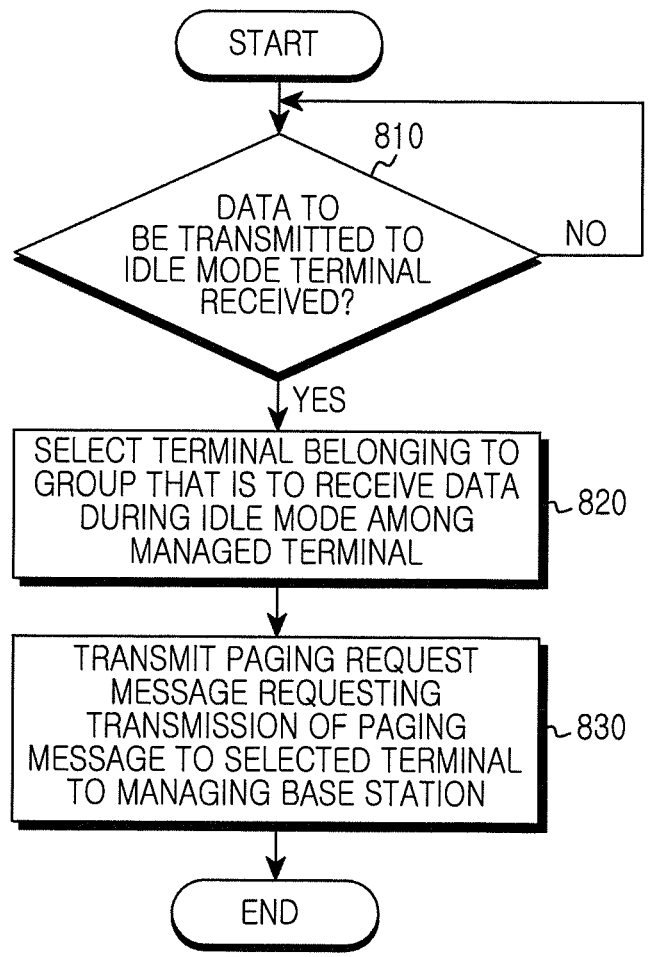
FIG. 8 illustrates a process of operating a machine communication paging controller in an M2M communication system according to an exemplary embodiment of the present invention.

FIG. 8 illustrates a process of operating a machine communication paging controller in an M2M communication system according to an exemplary embodiment of the present invention.

Referring to FIG. 8, when receiving data to be transmitted to an idle mode terminal from an M2M communication server (block 810), the paging controller selects a terminal belonging to a group that is to receive data during an idle mode among managed terminals (block 820).

Thereafter, the paging controller transmits a paging request message requesting transmission of a paging message to the selected terminal to a managing base station (block 830).

Thereafter, the paging controller ends the algorithm according to an exemplary embodiment of the present invention.

Figure 9:
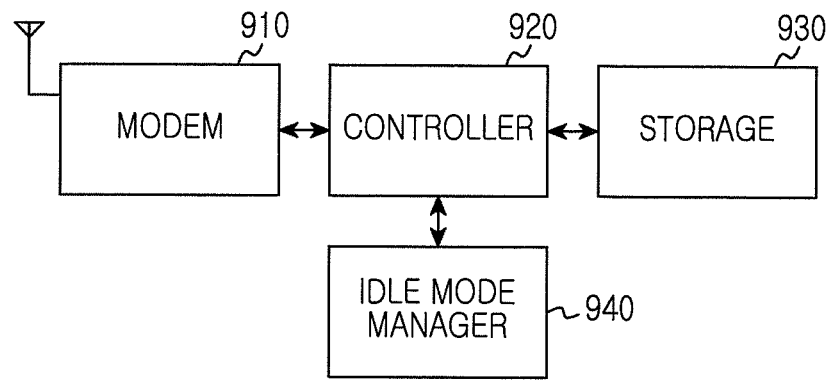
FIG. 9 illustrates a terminal in an M2M communication system according to an exemplary embodiment of the present invention.

FIG. 9 illustrates a terminal in an M2M communication system according to an exemplary embodiment of the present invention.

Referring to FIG. 9, the terminal includes a modem 910, a controller 920, a storage 930, and an idle mode manager 940. According to an exemplary embodiment of the present invention, the modem 910 includes a Radio Frequency (RF) processor.

The RF processor performs functions for transmitting/receiving a signal via an RF channel such as band conversion and amplification of a signal, etc. That is, the RF processor up-converts a baseband signal provided from the modem 910 into an RF signal and then transmits the same via an antenna, and down-converts an RF signal received via the antenna into a baseband signal.

The modem 910 performs a conversion function between a baseband signal and a bit line according to a physical layer standard of the system. For example, during data transmission, the modem 910 generates complex symbols by encoding and modulating a transmission bit line, maps the complex symbols to subcarriers, and then configures OFDM symbols by performing Inverse Fast Fourier Transform (IFFT) and Cyclic Prefix (CP) insertion. In addition, during data reception, the modem 910 divides a baseband signal provided from the RF processor on an OFDM symbol basis, recovers signals mapped to subcarriers by performing NFT, and then recovers a reception bit line via demodulation and decoding.

The storage 930 stores a basic program for an operation of the terminal, an application program, and data of user contents, and the like. In addition, the storage 930 provides stored data according to a request of the controller 920.

The controller 920 controls an overall operation of the terminal. For example, the controller 920 configures downlink data to provide the same to the modem 910, and reads uplink data provided from the modem 910. In addition, the controller 920 controls an idle mode manager 940, and can perform the function of the idle mode manager 940. That is, the controller 920 can control the modem 910 to transmit/receive data.

The idle mode manager 940 enters a paging listening interval, receives a paging message during the paging listening interval, and determines whether the DL data only indicator for whether only group data should be received has been set to the terminal.

When the DL data only indicator for whether only group data should be received is included, the idle mode manager 940 receives data transmitted via a downlink resource encoded using an identifier mask of a aroup to which the idle mode manager 940 belongs.

Thereafter, the idle mode manager 940 enters a paging non-listening interval of the idle mode.

When, the DL data only indicator for whether only group data should be received is not included and a network reentry indicator for whether the terminal should receive group data and transmit uplink data is included in the received paging message, the idle mode manager 940 receives data transmitted via a downlink resource encoded using an identifier mask of a group to which the terminal belongs.

The idle mode manager 940 decodes an uplink resource allocated to the terminal using an identifier determined to be used by the terminal and transmits data via the uplink resource during the idle mode. Thereafter, the idle mode manager 940 makes a transition to a paging non-listening interval of the idle mode.

When information regarding the terminal is not included in the paging message, the idle mode manager 940 makes a transition to the paging non-listening interval of the idle mode.

In the above block configuration, as described above, the controller 920 can perform the function of the idle mode manager 940.

Separate configuration and illustration of the idle mode manager 940 in an exemplary embodiment of the present invention is for separately describing each function. Therefore, in actual realization of a product, all or some of the functions of the idle mode manager 940 can be processed by the controller 920.

Figure 10:
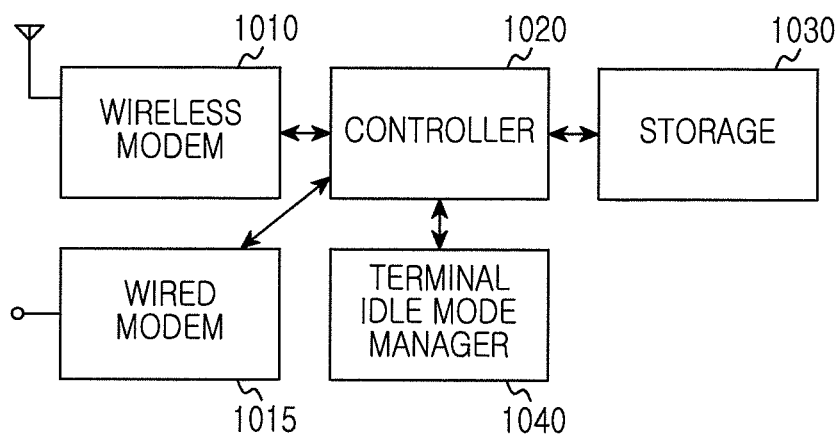
FIG. 10 illustrates an M2M communication server, a paging controller, and a base station in an M2M communication system according to an exemplary embodiment of the present invention.

FIG. 10 illustrates an M2M communication server, a paging controller, and a base station in an M2M communication system according to an exemplary embodiment of the present invention.

The M2M communication server and the paging controller include a wired modem 1015, a controller 1020, a storage 1030, and a terminal idle mode manager 1040.

The base station includes a wireless modem 1010, a wired modem 1015, a controller 1020, a storage 1030, and a terminal idle mode manager 1040. Here, the wireless modem 1010 includes an RF processor.

The RF processor performs functions for transmitting/receiving a signal via an RF channel such as band conversion and amplification of a signal, etc. That is, the RF processor up-converts a baseband signal provided from the wireless modem 1010 into an RF signal and then transmits the same via an antenna, and down-converts an RF signal received via the antenna into a baseband signal.

The wireless modem 1010 performs a conversion function between a baseband signal and a bit line according to a physical layer standard of the system. For example, during data transmission, the wireless modem 1010 generates complex symbols by encoding and modulating a transmission bit line, maps the complex symbols to subcarriers, and then configures OFDM symbols by performing Inverse Fast Fourier Transform (IFFT) and Cyclic Prefix (CP) insertion. In addition, during data reception, the wireless modem 1010 divides a baseband signal provided from the RF processor on an OFDM symbol basis, recovers signals mapped to subcarriers by performing FFT, and then recovers a reception bit line via demodulation and decoding.

The wired modem 1015 provides an interface for performing communication with a different node.

The storage 1030 stores basic programs for operations of the M2M communication server, the paging controller, or the base station, application programs, and data such as user contents. In addition, the storage 1030 provides stored data according to a request of the controller 1020.

The controller 1020 controls overall operations of the M2M communication server, the paging controller, and the base station. In addition, the controller 1020 can control the wired modem 1015 and the wireless modem 1010 to transmit/receive data.

First, the base station is described. The controller 1020 of the base station configures downlink data to provide the same to the wireless modem 1010, and reads uplink data provided by the wireless modem 1010. In addition, the controller 1020 controls the terminal idle mode manager 1040, and can perform the function of the terminal idle mode manager 1040.

The terminal idle mode manager 1040 receives a paging request message from a paging controller. When a DL data only indicator for whether the terminal should receive only group data is included in the paging request message, the terminal idle mode manager 1040 configures a paging message including a DL data only indicator for whether the terminal should receive only an identifier of the group and the group data.

When a network reentry indicator for whether a terminal should receive group data and transmit uplink data is included in the paging request message, the terminal idle mode manager 1040 configures a paging message including a network reentry indicator for whether the terminal identifier and the group data should be received and uplink data should be transmitted. Thereafter, the terminal idle mode manager 1040 transmits the paging message at a point corresponding to a paging listening interval.

When a DL data only indicator for whether only group data should be received is included in the paging message, the terminal idle mode manager 1040 transmits data to a terminal belonging to a group via a downlink resource encoded using an identifier mask of the relevant group.

When a network reentry indicator for whether group data should be received and whether uplink data should be transmitted is included in the paging message, the terminal idle mode manager 1040 transmits data to a terminal belonging to a group via a downlink resource encoded using an identifier mask of the relevant group.

In addition, the terminal idle mode manager 1040 allocates a resource required for transmitting uplink data at a relevant terminal, and the resource is encoded using an identifier mask determined to be used by the terminal during the idle mode.

Thereafter, the terminal idle mode manager 1040 receives data from the terminal via the uplink resource. Here, a point of allocating the uplink resource to the terminal corresponds to the same frame as a point of transmitting downlink data or the next frame.

Now, the M2M communication server is described. When data to be transmitted to an idle mode terminal occurs, a terminal idle mode manager 1040 of the M2M communication server transmits the occurring data to a paging controller.

Now, the paging controller is described. When receiving data to be transmitted to an idle mode terminal from the M2M communication server, a terminal idle mode manager 1040 of the paging controller selects a terminal belonging to a group that is to receive data during an idle mode among managed terminals. Thereafter, the terminal idle mode manager 1040 transmits a paging request message requesting paging message transmission to the selected terminal to a managing base station.

In the above block configuration, as described above, the controller 1020 can perform the function of the terminal idle mode manager 1040. Separate configuration and illustration of the terminal idle mode manager 1040 in an exemplary embodiment of the present invention is for separately describing each function. Therefore, in actual realization of a product, all or some of the functions of the terminal idle mode manager 1040 can be processed by the controller 1020.

In the case where a device that has subscribed to the same service group remains in an idle mode in an M2M communication system, a method for transmitting/receiving data even when the subscribed device does not perform a procedure of accessing a system is provided, so that access collision that can occur while the subscribed device accesses the system can be prevented and an access delay can be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating an idle mode terminal in a Machine to Machine (M2M) communication system, the method comprising:
    receiving a paging message from a base station during a paging listening interval;
    determining whether an indicator indicating a network reentry or an indicator indicating receiving of multicast data without the network reentry is included in the paging message, the multicast data for an M2M group to which one or more M2M terminals belong; and
    when the indicator indicating the receiving of the multicast data is included in the paging message, receiving the multicast data without the idle mode termination from the base station.

2. The method of claim 1, further comprising:
    when the indicator of the network reentry indicating the receiving of the multicast data and the transmitting of uplink data is included in the paging message, receiving the multicast data; and
    transmitting the uplink to the base station.

3. The method of claim 2, wherein when the indicator of the network reentry indicating the receiving of the multicast data and the transmitting of the uplink data is included in the paging message, wherein the receiving of the multicast data comprises receiving the multicast data from the base station via a downlink resource allocated corresponding to an identifier of the M2M group, and wherein the transmitting of the uplink data to the base station comprises transmitting the uplink data to the base station via an uplink resource allocated by the base station.

4. The method of claim 3, wherein the paging message comprises:
    identifier information of one or more M2M groups;
    an indicator indicating the receiving of the multicast data;
    an indicator indicating the receiving of the multicast data and the transmitting of the uplink data;
    an identifier of an M2M group to receive the multicast data; and
    an identifier of an M2M terminal for receiving the multicast data and transmitting the uplink data.

5. The method of claim 2, wherein the identifier of the M2M group comprises:
    a masking prefix for a resource of the M2M group data;
    an indicator informing a resource of the multicast data;
    an M2M group identifier for a resource of the multicast data; and
    an identifier representing the multicast data.

6. The method of claim 1, wherein the receiving of the multicast data without the idle mode termination from the base station comprises:
    receiving the multicast data from the base station via a downlink resource allocated corresponding to an identifier of the M2M group.

7. A method for operating a base station in a Machine to Machine (M2M) communication system, the method comprising:
    transmitting a paging message during a paging listening interval to at least one M2M terminal with an idle mode, the paging message including an indicator indicating a network reentry or an indicator indicating receiving of multicast data without the network reentry, the multicast data being for an M2M group to which the M2M terminal belongs; and
    when the indicator indicating the receiving of the multicast data is included in the paging message, transmitting the multicast data to the M2M terminal such that the M2M terminal can receive the multicast data without the idle mode termination.

8. The method of claim 7, further comprising:
    transmitting the paging message to the M2M terminal during the paging listening interval, the paging message including an indicator indicating the receiving of the multicast data and the transmitting of an uplink data;
    transmitting the multicast data to the M2M terminal via a downlink resource allocated corresponding to an identifier of the M2M group; and
    receiving the uplink data from the M2M terminal via an uplink resource allocated to the M2M terminal.

9. The method of claim 8, wherein the paging request message comprises:
    an identifier of the M2M group and the M2M terminal to receive data;
    an indicator indicating that the M2M terminal receives only the multicast data; and
    an indicator indicating that the M2M terminal receives the multicast data and transmits the uplink data.

10. The method of claim 8, wherein the paging message comprises:
    identifier information of the M2M group;
    an indicator indicating the receiving of the multicast data;
    the indicator indicating the receiving of the multicast data and the transmitting of the uplink data;
    an identifier of the M2M group to receive the multicast data; and
    an identifier of the M2M terminal for receiving the multicast data and for transmitting the uplink data.

11. The method of claim 8, wherein the identifier of the M2M group comprises:
    a masking prefix for a resource of the M2M data;
    an indicator informing a resource of the multicast data;
    an M2M group identifier for a resource of the multicast data; and
    an identifier representing the multicast data.

12. The method of claim 8, further comprising:
when an indicator indicating the receiving of the multicast data and the transmitting of the uplink data is included in the paging request message, configuring the paging message including the indicator indicating that the M2M terminal receives the multicast data and transmits the uplink data.

13. The method of claim 7, wherein the transmitting of the multicast data to the M2M terminal comprises:
transmitting the multicast data to the M2M terminal via a downlink resource allocated corresponding to an identifier of the M2M group.

14. The method of claim 12, further comprising:
receiving a paging request message; and
when an indicator indicating that the M2M terminal receives the multicast data is included in the paging request message, configuring the paging message including the indicator indicating that the M2M terminal receives the multicast data.

15. An apparatus of an idle mode terminal in a Machine to Machine (M2M) communication system, the apparatus comprising:
a transceiver; and
a controller configured to control the transceiver to:
receive a paging message during a paging listening interval, determine whether an indicator indicating a network reentry or an indicator indicating receiving of multicast data without the network reentry is included in the paging message, the multicast data being for an M2M group to which one or more M2M terminals belong; and
when the indicator indicating the receiving of the multicast data is included in the paging message, receive the multicast data without the idle mode termination from the base station.

16. The apparatus of claim 15, wherein the controller is configured to:
when the indicator of the network reentry indicating the receiving of the multicast data and the transmitting of uplink data is included in the paging message, receive the multicast data; and
transmit the uplink data to the base station.

17. The apparatus of claim 16, wherein when the indicator of the network reentry indicating the receiving of the multicast data and the transmitting of the uplink data is included in the paging message,
the transceiver is configured to:
receive the multicast data from the base station via a downlink resource allocated corresponding to an identifier of the M2M group; and
transmit the uplink data to the base station via an uplink resource allocated by the base station.

18. The apparatus of claim 17, wherein the paging message comprises:
identifier information of one or more M2M groups;
an indicator indicating the receiving of the multicast data;
an indicator indicating the receiving of the multicast data and the transmitting of the uplink data;
an identifier of the M2M group to receive the multicast data; and
an identifier of an M2M terminal for receiving the multicast data and transmitting the uplink data.

19. The apparatus of claim 16, wherein the identifier of the M2M group comprises:
a masking prefix for a resource of the M2M group data;
an indicator informing a resource of the multicast data;
an M2M group identifier for a resource of the multicast data; and
an identifier representing the multicast data.

20. The apparatus of claim 15, wherein the transceiver is configured to receive the multicast data from the base station via a downlink resource allocated corresponding to an identifier of the M2M group.

21. An apparatus of a base station in a Machine to Machine (M2M) communication system, the apparatus comprising:
a transceiver; and
a controller configured to control the transceiver to:
transmit a paging message during a paging listening interval to at least one M2M terminal with an idle mode, the paging message including an indicator indicating a network reentry or an indicator indicating receiving of multicast data without the network reentry, the multicast data for an M2M group to which the M2M terminal belongs; and
when the indicator indicating the receiving of the multicast data is included in the paging message, transmit the multicast data to the M2M such that the M2M terminal can receive the multicast data without the idle mode termination.

22. The apparatus of claim 21, wherein
the transceiver is configured to:
transmit the paging message to the M2M terminal during the paging listening interval, the paging message including an indicator indicating the receiving of the multicast data and the transmitting of an uplink data;
transmit the multicast data to the M2M terminal via a downlink resource allocated corresponding to an identifier of the M2M group; and
receive the uplink data from the M2M terminal via an uplink resource allocated to the M2M terminal.

23. The apparatus of claim 22, wherein the paging request message comprises:
an identifier of the M2M group and the M2M terminal to receive data;
an indicator indicating that the M2M terminal receives only the multicast data; and
an indicator indicating that the M2M terminal receives the multicast data and transmits the uplink data.

24. The apparatus of claim 22, wherein the paging message comprises:
identifier information of a multicast the M2M group;
an indicator indicating the receiving of the multicast data;
the indicator indicating the receiving of the multicast data and the transmitting of the uplink data;
an identifier of the M2M group to receive the multicast data; and
an identifier of the M2M terminal for receiving the multicast data and transmitting the uplink data.

25. The apparatus of claim 22, wherein the identifier of the M2M group comprises:
a masking prefix for a resource of the M2M group data;
an indicator informing a resource of the multicast data;
an M2M group identifier for a resource of the multicast data; and
an identifier representing the multicast data.

26. The apparatus of claim 22, wherein the controller is further configured to:
when an indicator indicating the receiving of the multicast data and the transmitting of the uplink data is included in the paging request message, configure the paging message including the indicator indicating that the M2M terminal receives the multicast data and transmits the uplink data.

27. The apparatus of claim 21, wherein the transceiver is configured to:
 transmit the multicast data to the M2M terminal via a downlink resource allocated corresponding to an identifier of the M2M group.

28. The apparatus of claim 27, wherein the transceiver is further configured to:
 receive a paging request message; and
 when an indicator indicating that the M2M terminal receives the multicast data is included in the paging request message, configure the paging message including the indicator indicating that the M2M terminal receives the multicast data.

\* \* \* \* \*